United States Patent [19]

Gimpel et al.

[11] Patent Number: 5,023,066
[45] Date of Patent: Jun. 11, 1991

[54] PROCESS FOR INTRODUCTION OF SILICON ATOMS INSTEAD OF ALUMINUM ATOMS IN THE CRYSTAL LATTICE OF A ZEOLITE OF THE FAUJASITE TYPE

[75] Inventors: Moritz Gimpel, Obernburg, Fed. Rep. of Germany; Jan W. Roelofsen, Oegstgeest, Netherlands

[73] Assignee: Akzo N.V., Arnhem, Netherlands

[21] Appl. No.: 200,906

[22] Filed: Jun. 1, 1988

[30] Foreign Application Priority Data

Jun. 6, 1987 [DE] Fed. Rep. of Germany ....... 3719049

[51] Int. Cl.$^5$ .............................................. C01B 33/34
[52] U.S. Cl. ....................................... 423/328; 502/85
[58] Field of Search .............. 423/328, 328 C, 328 M, 423/118; 502/85, 79

[56] References Cited

U.S. PATENT DOCUMENTS

| 3,130,007 | 4/1964 | Breck ................................... 423/329 |
| 3,293,192 | 12/1966 | Maher et al. . |
| 3,402,996 | 9/1968 | Maher et al. . |
| 3,591,488 | 7/1971 | Eberly, Jr. et al. . |
| 3,644,220 | 2/1972 | Kearby . |
| 3,980,586 | 9/1976 | Mitchell . |
| 4,402,867 | 9/1983 | Rodewald . |
| 4,569,833 | 2/1986 | Gortsema et al. ............. 423/328 C |

FOREIGN PATENT DOCUMENTS

| 0062123 | 10/1982 | European Pat. Off. . |
| 0082211 | 6/1983 | European Pat. Off. . |
| 0134849 | 8/1983 | European Pat. Off. . |
| 0091076 | 10/1983 | European Pat. Off. . |
| 0100544 | 2/1984 | European Pat. Off. . |
| 0112601 | 7/1984 | European Pat. Off. . |

OTHER PUBLICATIONS

Hermann K. Beyer et al., "Preparation of High-Silica Faujasites by Treatment with Silicon Tetrachloride", *J. Chem. Soc., Faraday Trans. 1*, 1985, 81, 2889–2901.

P. J. Grobet et al, "Study of the Silicon Tetrachloride Dealumination of NaY by a Combination of N.M.R. and I.R. Methods", *Zeolites*, Jan. 1986, vol. 6, pp. 47–50.

C. V. McDaniel et al, "New Ultra-Stable Form of Faujasite", Soc. Chem. Ind. (1968), pp. 186–195.

Hermann K. Beyer et al, "A New Method for the Dealumination of Faujasite-Type Zeolites", Catalysis by Zeolites (1980), pp. 203–210.

*Primary Examiner*—Gary P. Straub
*Assistant Examiner*—Stuart L. Hendrickson
*Attorney, Agent, or Firm*—Oliff & Berridge

[57] ABSTRACT

Process for introduction of silicon atoms instead of aluminum atoms in the crystal lattice of a zeolite of the faujasite type with a halosilane at temperatures lower than 150° C., then washing. The resulting zeolites are particularly suitable for the conversion of hydrocarbons, above all for cracking. They are distinguished by their ultrastability and good activity.

10 Claims, No Drawings

PROCESS FOR INTRODUCTION OF SILICON ATOMS INSTEAD OF ALUMINUM ATOMS IN THE CRYSTAL LATTICE OF A ZEOLITE OF THE FAUJASITE TYPE

TECHNICAL FIELD

The invention relates both to a process for introduction of silicon atoms instead of aluminum atoms in the crystal lattice of a zeolite of the faujasite type by treatment with a halosilane at elevated temperature, and to the use of the product thereof as a cracking catalyst.

BACKGROUND

The term zeolites is generally understood to mean alkali metal or alkaline earth aluminosilicates of the general formula $$M_{2/n}O \cdot Al_2O_3 \cdot y\, SiO_2 \cdot z\, H_2O$$

wherein M is a univalent or multivalent metal, H, $NH_4$, $CH_3$-$NH_3$, etc. and n indicates its valence, y lies between 1.8 and about 12 and z lies between 0 and 9. Their crystal lattice consists of cubo-octahedra with corner points of $SiO_2$ and $AlO_4$ tetrahedra. Characteristically they form a system of identically structured cavities with pore openings of the same size therebetween.

Among other purposes, zeolites are used for selective adsorption as well as for catalytic processes. In petrochemistry they are used, for example, for separation of isomeric hydrocarbons and also as catalysts in hydrogenation, isomerization and cracking of hydrocarbons. Synthetic zeolites of the faujasite type are particularly important for this application. Mainly zeolite X with y=2 to 3 and zeolite Y with y=3 to about 50 are used as catalysts.

The $SiO_2/Al_2O_3$ ratio is essentially fixed during the synthesis of the zeolites. A subsequent change thereof is possible to only a very limited extent if other properties, especially the crystallinity, are not to suffer thereby. Nevertheless, for many fields of use, the desire exists to change the ratio as widely as possible, since positive effects are associated therewith; thus zeolites richer in silica prove to be more resistant to high temperature and acids. Moreover, they influence the selectivity when they are used in catalysts.

Intensive work has therefore been done on increasing the silicon-to-aluminum molar ratio.

Thus the following aluminum-removal processes are known: steam treatment at high temperature of, e.g., 700° C. (see U.S. Pat. No. 3,591,488), calcining of $NH_4Y$ zeolites, extraction with chelating agents such as EDTA, acetylacetonate, etc. (see West German Laid-open Applications 1,467,149 and 2,061,285), leaching with acids and bases (see East German Patent 121,331) and reactions with halogen or acid in the gas phase, e.g., $F_2$, $Cl_2$, HCl, etc.

Attempts have also been made to replace the aluminum by silicon. Silicon compounds such as $SiCl_4$, $SiF_4$, $(NH_4)_2SiF_6$, etc. have been used for this purpose.

In "Catalysis by Zeolites", 1980, Elsevier, Amsterdam, page 203 ff., Hermann K. Beyer and Ita Belenykaja describe the synthesis of a highly crystalline zeolite of the faujasite type, essentially indicating first a reaction with gaseous $SiCl_4$ between 730 and 830° K. and then a washing treatment with water. The reaction obviously does not begin until 730° K.

In European Patent A2-72,397, a process was described for synthesis of ultrastable zeolites of the Y type by thermal removal of aluminum from activated zeolites of the Y type using gaseous halosilanes under conditions of exclusion of water; the activated zeolites have to be reacted at temperatures of 150° to 450° C., preferably 200° to 400° C., especially between 250 and 380° C. The reaction product is washed with water until free of halogen. In the preferred temperature ranges, zeolites with cell constants $a_o$ of 2.442 to 2.423 nm and $SiO_2/Al_2O_3$ ratios of 7 to 39 are obtained. No mention is made of the crystallinity.

In European Patent B1-82,211, a process is described for introduction of silicon atoms into the crystal lattice of an aluminum zeolite at temperatures between 20° and 95° C. by reaction with a fluorosilicate salt. Disadvantages therein are that the sodium ions must be exchanged by ammonium ions before aluminum removal, that expensive monitoring provisions are necessary because of the pH constancy and that the handling of fluoride compounds is problematic because of corrosion, toxicity and environmental protection.

In European Patent A1-62,123, a process is described for aluminum removal from aluminosilicates with inorganic halides, such as, e.g., $SiCl_4$, at elevated temperature sufficient for volatilization of the formed Al compounds. When the halogen is Cl, the temperature lies preferably betwen 140° and 760° C. In the examples, processing takes place at 540° C. In such a case the removal of the reaction products lasts 1 to 7 days.

In U.S. Pat. No. 3,644,220, a process is described for treatment of crystalline zeolites while largely preserving their crystallinity, the zeolites being allowed to react with volatile halogen compounds, including those of silicon, at elevated temperature, especially at 200° to 650° C. (400° to 1200° F.) and then being washed with water or aqueous ammonium hydroxide.

SUMMARY OF THE INVENTION

An object of the invention is to provide a new process for the synthesis of zeolites of the faujasite type while avoiding the disadvantages of the known processes and in particular obtaining new zeolites with special catalytic properties such as activity, selectivity and stability to acids and temperatures.

The process according to the invention comprises allowing an activated crystalline zeolite of the faujasite type to react with a halosilane at elevated temperature and then washing the reaction mixture, the elevated temperature being lower than 150° C.

DETAILED DESCRIPTION OF PREFERRED EMBODIMENTS OF THE INVENTION

Zeolites of the faujasite type, especially of the Y type with univalent or multivalent cations, including $NH_4^+$ and even a mixture of cations, are suitable starting materials. The Na-Y type is preferred. For activation, the zeolites are dried at about 400° C. to a water content of less than 2 weight percent. In all subsequent process steps, the strictest care must be taken to exclude moisture, certainly until washing with water. The crystallinity of the starting materials is at least 80%.

The process according to the invention can be applied advantageously even to combinations of zeolites of the faujasite type with silica gel, amorphous aluminosilicate and/or clay as the matrix. The thus obtained combinations according to the invention can be used directly, e.g., as cracking catalysts.

The term halosilanes is to be understood to mean halogen-containing derivatives of silanes, i.e., fluorine-, chlorine- or bromine-containing silanes, which can also be further substituted with organic groups, such as alkyl groups. Chlorosilanes such as trimethylchlorosilane, dimethyldichlorosilane and trichloromethylsilane, especially silicon tetrachloride, are preferred. The halosilane is preferably used in gaseous form, if necessary diluted with a carrier gas. The concentration can be varied within wide limits and, for example, the ratio of the volumes of carrier gas and halosilane can extend from 0.01 to 100.

The reaction usually lasts about 2 hours. It is advantageously conducted in a fluidized-bed or agitated-bed reactor. However, a rotating tubular reactor can also be used. The reaction temperature is below 150° C., preferably below 140° C., and most advantageously 80° to 120° C. It is appropriate to operate with a temperature gradient, beginning with the low temperature, possibly even with room temperature.

After the reaction, the reaction mixture is allowed to cool to room temperature.

The reaction mixture is now washed. This is done appropriately with a buffer solution, e.g., with sodium acetate or with ammonium sulfate. However, it is advantageous to treat the reaction mixture first with a nonaqueous liquid such as acetone or alcohol. Ethanol and methanol are most especially well suited. The washing process can be accelerated by boiling in the liquid.

The reaction product is finally washed with water until free of halogen and dried, preferably at 100° C.

The zeolites which can be synthesized by the process according to the invention have the following properties: their crystallinity is 80% and higher, especially 85 to 95%, and their cell constant $a_o$ is 2.448 to 2.465, especially 2.450 to 2.455 nm.

Their porosity is also characteristic. The zeolites synthesized according to the invention exhibit no mesosize pore structure (2.0 to 10.0 nm pore diameter).

The narrow bandwidth of the IR and NMR spectra is also typical of the zeolites according to the invention.

As described in European Patent 112,601, the zeolites can be further processed to cracking catalysts. Their properties can be tested by, among other methods, the micro-activity test, as described in European Patent 112,601 and in the proceedings of the symposium of 25 to 30 May 1982 in Amsterdam, Netherlands on pages FCC/80-84, and they proved to be unexpectedly good.

The properties of the zeolites synthesized according to the invention have been determined by the following measurement methods: the crystallinity was determined by the X-ray method of P.H. Hermans et al. See "Roentgenographische Kristallinitaetsbestimmung bei Hochpolymeren" (X-Ray Determination of Crystallinity in High Polymers) in Experienta, Vol. XIX, No. 11, pages 553-564 (1963).

The cell constant ao has been determined from several reflections of the X-ray diffraction spectrum by ASTM Method D 3942/80, and it corresponds to the edge length of a cubic unit cell.

The BET 3 parameter method is described on page 45 of "Adsorption, Surface Area and Porosity" (Academic Press, 1982) by S.J. Gregg and K.S.W. Sing.

The reaction temperature was determined directly in the reaction phase.

The products obtained according to the invention have, inter alia, the following advantages:

They have excellent catalyst properties such as ultrastability (e.g., extensive preservation of crystallinity after steam treatment) and good activity. The ultrastability in particular was unexpected, since neither the requirement of contraction of the unit cell by 1 to 1.5% (see McDaniel and Maher in Soc. Chem. Ind. (1968), "Molecular Sieves", page 186) nor the requirement of a cell constant $a_o$ of smaller than 2.45 nm (see European Patent Al-134,849 as well as U.S. Pat. Nos. 3,293, 192 and 3,402,996 and McDaniel and Maher, supra) is met.

Moreover, the following advantages are also obtained: the zeolites synthesized according to the invention can be synthesized economically since the relatively low degrees of aluminum removal are obtained with correspondingly small $SiCl_4$ charges, energy is saved because of the low reaction temperature and the yield of catalytically active material also increases in proportion to the crystallinity.

EXAMPLE 1

Twenty grams of an Na-Y zeolite were dried at 400° C. for 2 hours, cooled with exclusion of moisture and suspended in 200 ml of dried (molecular sieve 4 angstroms) tetrachloroethylene. After addition of 25 ml of $SiCl_4$, the mixture was boiled for 2 hours under reflux (121° C.), while an $N_2$ stream was passed through the suspension. After cooling and filtering, the mixture was rinsed twice with methanol and boiled once. Finally it was washed with water until free of chloride.

The cell constant $a_o$ was 2.460 nm and the crystallinity was 83%.

EXAMPLE 2

As in Example 3, zeolites were synthesized in a rotating tube in accordance with the reaction conditions listed in the following Table 1, the cell constants $a_o$ and the crystallinity of those zeolites being given in Table 1.

TABLE 1

| Experiment No. | Reaction temp. °C. | Washing liquid | $a_o$ nm | Crystallinity % |
|---|---|---|---|---|
| 106 | 100 | Methanol | 2.458 | 84 |
| 120 | 100 | Ethanol | 2.457 | 81 |
| 109 | 100 | Methanol | 2.456 | 86 |
| 108 | 100 | Methanol | 2.456 | 79 |
| 110 | 100 | Methanol | 2.455 | 82 |
| 107 | 100 | Methanol | 2.453 | 86 |
| 127 B | 140 | Ethanol | 2.451 | 80 |
| 124 | 350 | $H_2O$ | 2.444 | 87 |
| 121 | 350 | $H_2O$ | 2.442 | 81 |
| 105 | 100 | $H_2O$ | 2.457 | 53 |
| 99 | 100 | $H_2O$ | 2.455 | 60 |
| 103 | 100 | $H_2O$ | 2.453 | 62 |
| 101 A | 145 | $H_2O$ | 2.451 | 70 |
| 165 | 150 | $H_2O$ | 2.449 | 72 |
| 127 A | 140 | $H_2O$ | 2.448 | 73 |
| 142 B | 250 | $H_2O$ | 2.446 | 79 |

EXAMPLE 3

One hundred twenty grams of an Na-Y zeolite ($a_o$=2.367 nm, crystallinity=91%, $Na_2O$=13.7%, $Al_2O_3$=21.7%, $SiO_2$=63.0%) wre activated at 380° C. in a rotating tubular reactor, treated for 2 hours with 13 liters of $N_2$ per hour and 3.5 g of $SiCl_4$ per liter of $N_2$ (see Table 2 for temperatures), cooled to room temperature and divided: one half was washed in $H_2O$ and the other half was rinsed twice with absolute ethanol, boiled under reflux for 1 hour in absolute ethanol, and then washed with H₂O until free of chloride. The samples were dried at 100° C. and analyzed.

TABLE 2

| | Product properties after processing in | | | |
|---|---|---|---|---|
| | H₂O | | Ethanol, 2. H₂O | |
| Reaction temp. °C. | Lattice const. nm | Cryst. % | Lattice const. nm | Cryst. % |
| (a) 140 | 2.448 | 73 | 2.451 | 80 |
| (b) 100 | 2.454 | 55 | 2.455 | 82 |
| (c) 20 | 2.450 | 26 | 2.456 | 57 |

From sample (b), 4 charges of 120 g were synthesized, processed in ethanol and analyzed as follows: $a_o = 2.455$ nm, crystallinity = 82%, $Al_2O_3$ = 14.9%, $SiO_2$ = 56.4%, $SiO_2/Al_2O_3$ = 6.4 (according to elemental analysis).

The $Al_2O_3$ content determined by elemental analysis represents the total of crystalline and amorphous $Al_2O_3$, of which the latter was produced only during the reaction or during processing. The cell constant is a better measure of the introduction of silicon atoms instead of aluminum atoms in the crystal lattice; according to the curve of Breck Flaniger, the cell constant of 2.455 nm corresponds approximately to an $SiO_2/Al_2O_3$ ratio of 7.0 to 7.5 in the crystal lattice.

Micro-activity tests with sample (b) revealed the thermal stability typical of ultrastable zeolites, i.e., a steam treatment at 795° C. does not destroy the catalyst. The cracking properties are very good, especially if the Na content has been lowered by ion exchange with a rare earth. The micro-activity test is described in European Patent 112,601.

EXAMPLE 4

Gas-solid reactions are conducted more advantageously in the fluidized-bed reactor. A broad zeolite particle-size distribution which changed continuously during the experiment caused problems in control of the reaction; therefore an agitated fluidized-bed reactor was used.

Under conditions corresponding to those of Example 3, the following products were obtained at about 140° C.:

a) 2.460 nm, 91% crystallinity,
b) 2.454 nm, 90% crystallinity.

We claim:
1. A process for introduction of silicon atoms instead of aluminum atoms in the crystal lattice of a zeolite of the faujasite type, comprising reacting an activated crystalline zeolite of the faujasite type with a halosilane at a reaction temperature of about 80° C. to 150° C. to form a reaction product, followed by washing said reaction product, wherein the reaction product is first washed with substantially non-aqueous liquid and then with water.

2. The process as set forth in claim 1, wherein the zeolite is a zeolite of the Y-type with the following formula:

$$M_{2/n}O \cdot Al_2O_3 \cdot y\, SiO_2 \cdot Z\, H_2O$$

where M represents a univalent or bivalent cation, n represents the valence of said cation, y is an integer or non-integer between 3 and 6 inclusive, and z is an integer or non-integer between 0 and 9 inclusive.

3. The process as set forth in claim 2, wherein said cation is Na+.

4. The process as set forth in claim 1, wherein the halosilane is a chlorosilane.

5. The process as set forth in claim 1, wherein said halosilane is silicon tetrachloride.

6. The process as set forth in claim 1, wherein said reaction temperature is lower than 140° C.

7. The process as set forth in claim 1, wherein said reaction temperature lies between 80° and 120° C.

8. The process as set forth in claim 1, wherein said nonaqueous liquid is at least one alcohol.

9. The process as set forth in claim 8, wherein said at least one alcohol is at least one member selected from the group consisting of methanol and ethanol.

10. The process as set forth in claim 1, wherein said zeolite and said halosilane are reacted for about two hours.

* * * * *

UNITED STATES PATENT AND TRADEMARK OFFICE
CERTIFICATE OF CORRECTION

PATENT NO. : 5,023,066

DATED : June 11, 1991

INVENTOR(S) : Moritz GIMPEL et al

It is certified that error appears in the above-identified patent and that said Letters Patent is hereby corrected as shown below:

Col. 4, line 34, change "Example 3" to --Example 1--.

Signed and Sealed this

Twenty-third Day of February, 1993

Attest:

STEPHEN G. KUNIN

*Attesting Officer*  *Acting Commissioner of Patents and Trademarks*